(12) United States Patent
Chen et al.

(10) Patent No.: US 7,571,966 B2
(45) Date of Patent: Aug. 11, 2009

(54) REMOVABLE WHEEL DEVICE FOR A STROLLER

(75) Inventors: Shun-Min Chen, Taipei (TW); Wen-Qu Hu, Taipei (TW)

(73) Assignee: Wonderland Nurserygoods Co., Ltd. (TW)

( * ) Notice: Subject to any disclaimer, the term of this patent is extended or adjusted under 35 U.S.C. 154(b) by 6 days.

(21) Appl. No.: 11/681,304

(22) Filed: Mar. 2, 2007

(65) Prior Publication Data

US 2008/0042487 A1 Feb. 21, 2008

(30) Foreign Application Priority Data

Aug. 15, 2006 (CN) .......................... 2006 2 0131123

(51) Int. Cl.
*B60B 35/00* (2006.01)
(52) U.S. Cl. .............................. 301/111.01; 301/111.05
(58) Field of Classification Search ............ 301/111.01, 301/111.05, 111.06, 119, 120, 121, 122, 301/125; 280/642, 647; 16/18 R, 30, 35 R; 188/19, 20, 21, 22, 31
See application file for complete search history.

(56) References Cited

U.S. PATENT DOCUMENTS

| | | | | |
|---|---|---|---|---|
| 565,630 A * | 8/1896 | Noelte | ........................ | 301/121 |
| 672,031 A * | 4/1901 | Clouse | ........................ | 301/121 |
| 921,912 A * | 5/1909 | Thede | ........................ | 301/121 |
| 5,476,275 A * | 12/1995 | Baechler et al. | .......... | 280/47.38 |
| 5,507,566 A * | 4/1996 | Chen | ...................... | 301/111.06 |
| 5,695,208 A * | 12/1997 | Baechler et al. | ............. | 280/204 |
| 6,003,956 A * | 12/1999 | Wu | ............................ | 301/120 |
| 6,056,369 A * | 5/2000 | Lin | ........................ | 301/111.06 |
| 6,237,725 B1 * | 5/2001 | Otterson et al. | ................ | 188/19 |
| 6,286,631 B1 * | 9/2001 | Kimble | ........................ | 188/19 |
| 6,598,712 B1 * | 7/2003 | Sun | .............................. | 188/20 |
| 6,938,964 B2 * | 9/2005 | Flood et al. | .................. | 301/119 |
| 7,383,925 B2 * | 6/2008 | Chen | ............................ | 188/20 |
| 2002/0096857 A1 * | 7/2002 | Valdez et al. | ................ | 280/293 |

FOREIGN PATENT DOCUMENTS

CN 200420083527.7 12/2005

* cited by examiner

*Primary Examiner*—S. Joseph Morano
*Assistant Examiner*—Kip T Kotter
(74) *Attorney, Agent, or Firm*—Ostrolenk, Faber, Gerb & Soffen, LLP (57) ABSTRACT

A removable wheel device includes a wheel unit, a housing, and a locking unit. The wheel unit includes a wheel body and a wheel axle formed with an annular groove. The wheel axle is extendible removably into the housing. The locking unit includes an actuator connected pivotally to the housing, an elastic member mounted between an operating end portion of the actuator and the housing, and a locking pin connected to a force transmitting end portion of the actuator. The operating end portion is depressible to move the force transmitting end portion from a locking position, where the locking pin extends into the annular groove to prevent removal of the wheel axle from the housing, to an unlocking position, where the locking pin is disengaged from the annular groove to permit removal of the wheel axle from the housing.

11 Claims, 9 Drawing Sheets

REMOVABLE WHEEL DEVICE FOR A STROLLER

CROSS-REFERENCE TO RELATED APPLICATION

This application claims priority of Chinese application no. 200620131123.X, filed on Aug. 15, 2006.

BACKGROUND OF THE INVENTION

1. Field of the Invention

The invention relates to a wheel device, more particularly to a removable wheel device for a stroller.

2. Description of the Related Art

Figure 1:
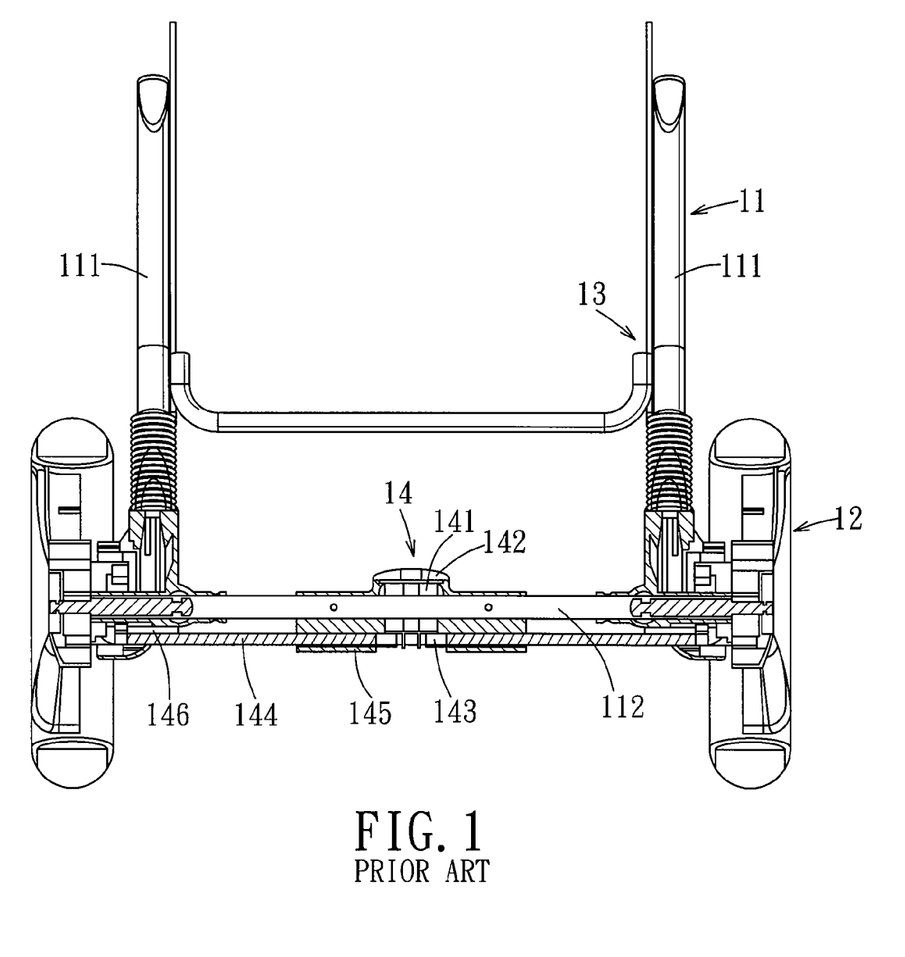
FIG. 1 is a fragmentary schematic partly sectional view of a rear wheel device of a conventional stroller.
Figure 2:
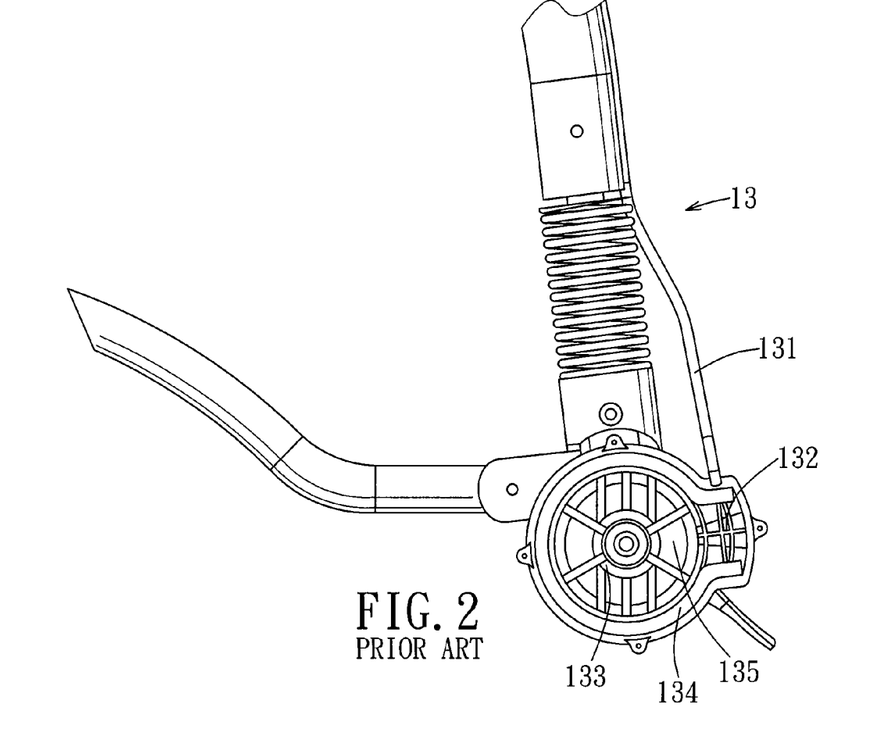
FIG. 2 is a fragmentary schematic side view of the rear wheel device of FIG. 1.
Figure 3:
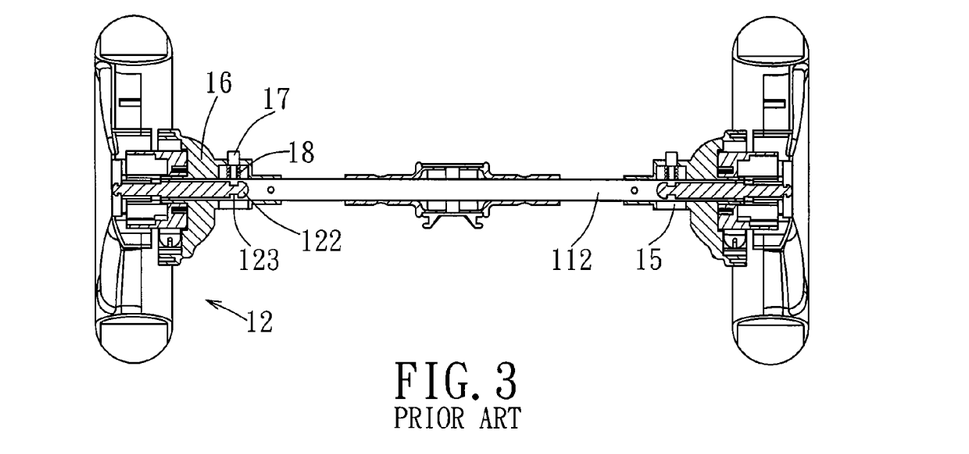
FIG. 3 is another fragmentary schematic partly sectional view to illustrate a quick release mechanism of the rear wheel device of FIG. 1.

FIGS. 1 to 3 illustrate a conventional rear wheel device for a stroller as disclosed in Chinese Patent Application No. 200420083541.7. The stroller includes a frame 11, a pair of wheels 12, a hand brake assembly 13, a foot brake assembly 14, and a pair of quick release caps 15. The frame 11 includes a pair of parallel and spaced apart rear leg tubes 111 interconnected by an axle sleeve tube 112. Each of the wheels 12 includes a wheel axle 122 that extends into the axle sleeve tube 112.

The hand brake assembly 13 includes a pull member 131, a cord 132 connected to the pull member 131, brake teeth units 133 mounted on the wheels 12 and formed with a plurality of positioning holes 135 evenly distributed relative to the wheel axles 122, and brake rings 134 each surrounding an outer periphery of a respective brake teeth unit 133 and normally spaced apart from the same. When it is desired to reduce speed of the stroller, the pull member 131 is pulled to drive the brake rings 134 via the cord 132 such that the brake rings 134 engage the brake teeth units 133 tightly, thereby resulting in friction to reduce stroller speed.

The foot brake assembly 14 includes a mounting seat 141 mounted on the axle sleeve tube 112, a brake pedal 142 connected pivotally to the mounting seat 141, a pair of brake sliders 143 controlled by the brake pedal 142 to move sideward, a pair of brake rods 144, a pair of limit springs 145, and a pair of restoring springs 146. Each of the limit springs 145 is disposed between a respective brake rod 144 and a respective brake slider 143. Each of the restoring springs 146 is provided on a respective brake rod 144 and is disposed proximate to a respective wheel 12. Each of the brake rods 144 can be extended into the positioning holes 135 in one of the brake teeth units 133 to result in interference.

Under normal conditions, the brake rods 144 do not extend into the positioning holes 135 and thus do not hinder movement of the stroller. When the brake pedal 142 is depressed, the brake sliders 143 as well as the brake rods 144 are driven to move sideward. The brake rods 144 extend into the positioning holes 135 to stop rotation of the wheels 12. Afterwards, when the brake pedal 142 is released, the restoring springs 146 bias the brake rods 144 to disengage the positioning holes 135.

Referring to FIG. 3, the wheel axle 122 of each wheel 12 is rotatable in the axle sleeve tube 112 and is formed with an annular groove 123. Each of two housings 16 is provided on a respective end of the axle sleeve tube 112. Each of two positioning pins 17 extends through a respective housing 16 and the axle sleeve tube 112, and into the annular groove 123 in the wheel axle 122 of a respective wheel 12. Each positioning pin 17 is coupled to a respective quick release cap 15 via a bolt (not shown). Each of two springs 18 is disposed between the axle sleeve tube 112 and a respective housing 16. The wheels 12 are locked on the frame 11 and the springs 18 are compressed when the positioning pins 17 extend into the annular grooves 123 in the wheel axles 122. When the bolts between the positioning pins 17 and the quick release caps 15 are loosened, the springs 18 expand to move the positioning pins 17 so as to permit removal of the wheels 12 from the frame 11. However, since loosening of the bolts between the positioning pins 17 and the quick release caps 15 is required before the wheels 12 can be removed, the wheel removing operation is inconvenient to conduct.

SUMMARY OF THE INVENTION

Therefore, the object of the present invention is to provide a removable wheel device that is easy to operate and install.

Another object of the present invention is to provide a stroller with a removable wheel device.

According to one aspect of the present invention, there is provided a removable wheel device adapted for mounting on a frame. The removable wheel device comprises a wheel unit, a housing, and a locking unit.

The wheel unit includes a wheel body and a wheel axle coupled to the wheel body. The wheel axle has an axis and an outer axle surface formed with an annular groove that surrounds the axis.

The housing is adapted to be mounted on the frame. The wheel axle is extendible removably into the housing.

The locking unit includes an actuator having an operating end portion, a force transmitting end portion opposite to the operating end portion, and a pivot portion located between the operating end portion and the force transmitting end portion and connected pivotally to the housing. The locking unit further includes an elastic member mounted between the operating end portion of the actuator and the housing, and a locking pin having a first pin end connected to the force transmitting end portion of the actuator and a second pin end opposite to the first pin end. The operating end portion of the actuator is depressible against restoring action of the elastic member to move the force transmitting end portion from a locking position, where the second pin end of the locking pin extends into the annular groove in the wheel axle to prevent removal of the wheel axle from the housing, to an unlocking position, where the second pin end of the locking pin is disengaged from the annular groove in the wheel axle to permit removal of the wheel axle from the housing.

According to another aspect of the present invention, there is provided a stroller that comprises a stroller frame, a removable wheel device, and a brake device.

The removable wheel device includes a wheel unit, a housing, and a locking unit.

The wheel unit includes a wheel body and a wheel axle coupled to the wheel body. The wheel axle has an axis and an outer axle surface formed with an annular groove that surrounds the axis.

The housing has a frame mounting portion mounted on the stroller frame, and a brake installing portion connected to the frame mounting portion. The wheel axle is extendible removably into the housing.

The locking unit includes an actuator having an operating end portion, a force transmitting end portion opposite to the operating end portion, and a pivot portion located between the operating end portion and the force transmitting end portion and connected pivotally to the frame mounting portion of the housing. The locking unit further includes an elastic member mounted between the operating end portion of the actuator and the housing, and a locking pin having a first pin end connected to the force transmitting end portion of the actuator and a second pin end opposite to the first pin end. The operating end portion of the actuator is depressible against restoring action of the elastic member to move the force transmitting end portion from a locking position, where the second pin end of the locking pin extends into the annular groove in the wheel axle to prevent removal of the wheel axle from the housing, to an unlocking position, where the second pin end of the locking pin is disengaged from the annular groove in the wheel axle to permit removal of the wheel axle from the housing.

The brake device includes a drum mounted to and co-rotatable with the wheel body, and a drum braking mechanism mounted to the brake installing portion and operable to stop rotation of the drum.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 4:
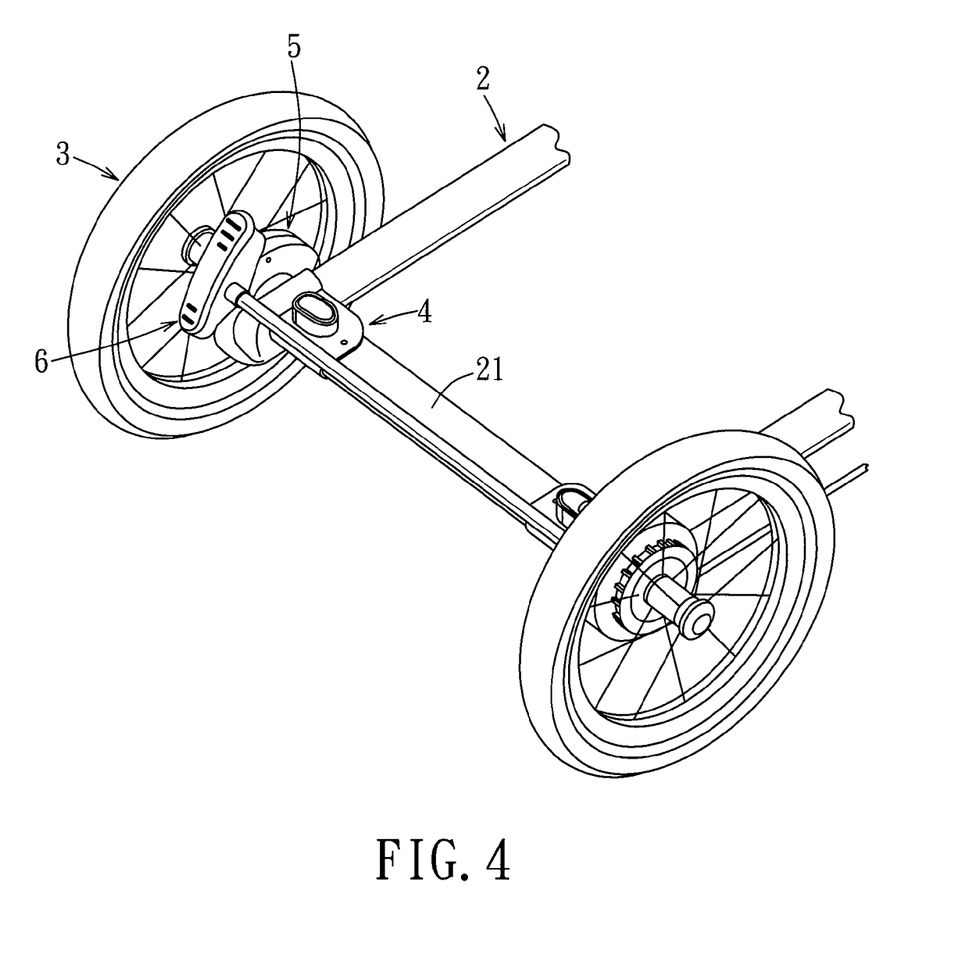
FIG. 4 is a fragmentary assembled perspective view of the first preferred embodiment of a stroller according to the present invention.
Figure 5:
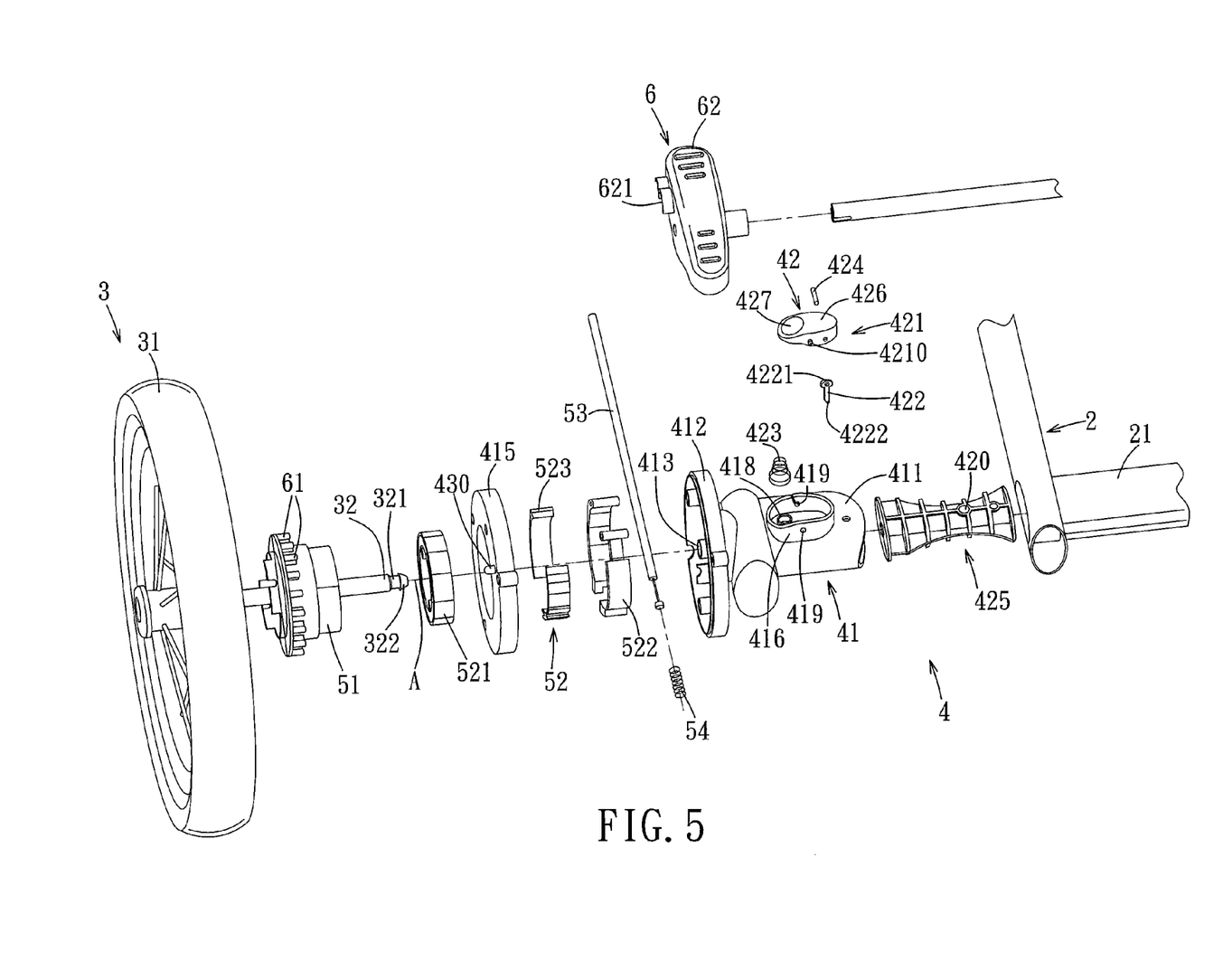
FIG. 5 is an exploded perspective view of a removable wheel device of the first preferred embodiment.

Referring to FIGS. 4 and 5, the first preferred embodiment of a stroller according to the present invention is shown to include a stroller frame 2, a front wheel (not shown) and a pair of removable wheel devices 4 (only one is shown) mounted on the stroller frame 2, a hand brake 5, and a foot brake 6. The removable wheel devices 4 are installed on opposite ends of a bottom frame rod 21 of the stroller frame 2. Since the removable wheel devices 4 are identical in construction, only one of them will be described in greater detail hereinafter for the sake of brevity.

Each removable wheel device 4 includes a wheel unit 3, a housing 41, and a locking unit 42.

The wheel unit 3 includes a wheel body 31 and a wheel axle 32 coupled to the wheel body 31. The wheel axle 32 has an axis (A) and an outer axle surface formed with an annular groove 321 surrounding the axis (A).

The housing 41 has a frame mounting portion 411 mounted on the bottom frame rod 21 of the stroller frame 2, a brake installing portion 412 connected to the frame mounting portion 411, and a brake cover 415 for covering one side of the brake installing portion 412 opposite to the frame mounting portion 411. The brake cover 415 and the brake installing portion 412 cooperate to define an accommodating space 410. The wheel axle 32 is extendible removably into the housing 41.

Figure 6:
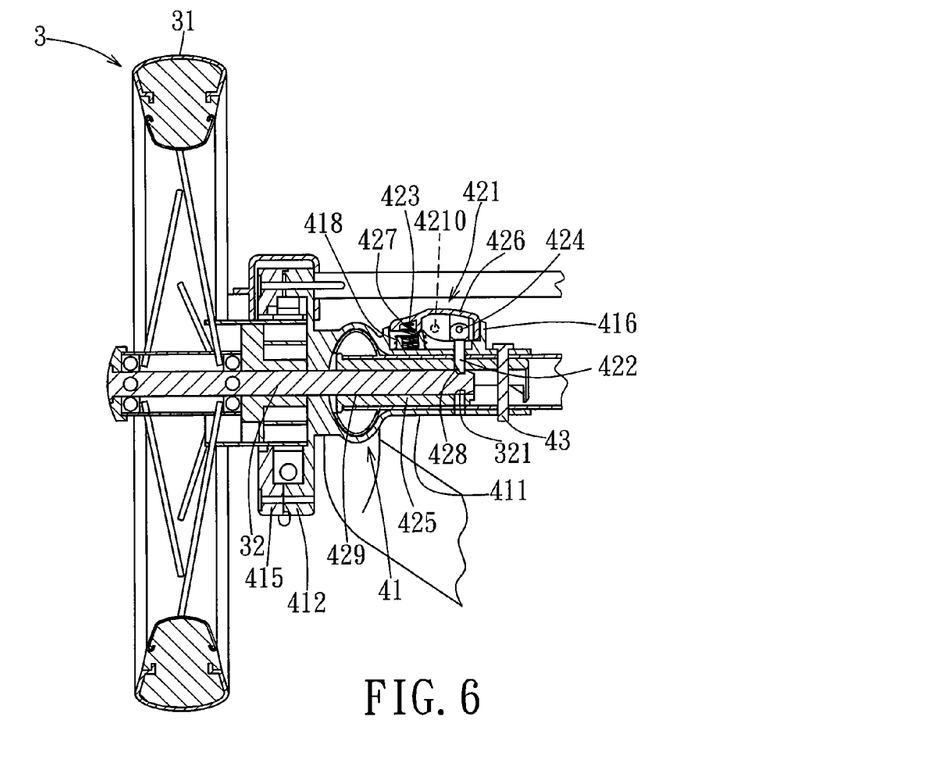
FIG. 6 is a schematic sectional view to illustrate a locked state of the removable wheel device of the first preferred embodiment.
Figure 7:
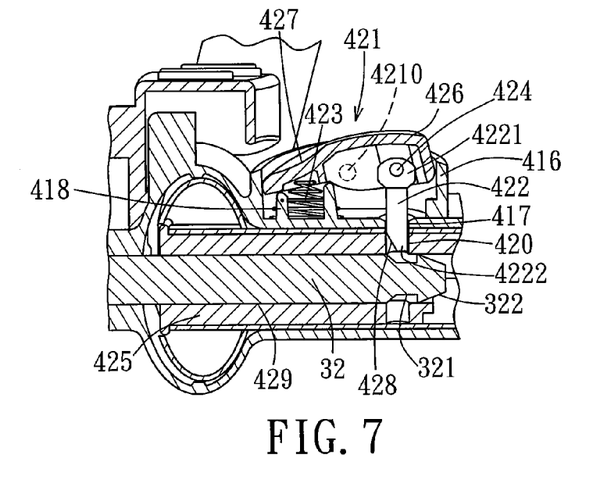
FIG. 7 is a fragmentary schematic sectional view to illustrate an unlocked state of the removable wheel device of the first preferred embodiment.

Referring further to FIGS. 6 and 7, the locking unit 42 includes a plug member 425, an actuator 421, a locking pin 422, an elastic member 423, and a pivot pin 424. The plug member 425 is disposed in the frame mounting portion 411 of the housing 41 and is fastened thereto by a fastener 43. The plug member 425 defines an axle receiving space 429 to receive the wheel axle 32, and is formed with a through hole 420 disposed radially relative to the axis (A) and in spatial communication with the axle receiving space 429. The frame mounting portion 411 of the housing 41 is formed with a positioning hole 417 registered with the through hole 420. The frame mounting portion 411 further has a retaining seat 418 disposed at one side of the positioning hole 417. Moreover, the frame mounting portion 411 of the housing 41 has an outer surface formed with a ring-shaped barrier 416 that surrounds the positioning hole 417 and the retaining seat 418. The actuator 421 is disposed in the ring-shaped barrier 416, and has an operating end portion 427, a force transmitting end portion 426 opposite to the operating end portion 427, and a pivot portion 4210 located between the operating end portion 427 and the force transmitting end portion 426. The ring-shaped barrier 416 is further formed with a pair of pivot holes 419 so that the pivot portion 4210 can be connected pivotally to the frame mounting portion 411 of the housing 41. The elastic member 423 is mounted between the operating end portion 427 of the actuator 421 and the retaining seat 418 of the housing 41. The locking pin 422 has a first pin end 4221 connected pivotally to the force transmitting end portion 426 of the actuator 421 via the pivot pin 424, and a second pin end 4222 opposite to the first pin end 4221. The operating end portion 427 of the actuator 421 is depressible to pivot the actuator 421 against restoring action of the elastic member 423 for moving the force transmitting end portion 426 from a locking position (see FIG. 6), where the second pin end 4222 of the locking pin 422 extends into the annular groove 321 in the wheel axle 32 via the positioning hole 417 in the frame mounting portion 411 of the housing 41 and the through hole 420 in the plug member 425 to prevent removal of the wheel axle 32 from the housing 41, to an unlocking position (see FIG. 7), where the second pin end 4222 of the locking pin 422 is disengaged from the annular groove 321 in the wheel axle 32 to permit removal of the wheel axle 32 from the housing 41.

In view of the above, when the wheel unit 3 is mounted to the bottom frame rod 21, the locking pin 422 extends through the positioning hole 417 and the through hole 420 to engage the annular groove 321 in the wheel axle 32, thereby securing the wheel unit 3 to the stroller frame 2. When removal of the wheel unit 3 is intended, the operating end portion 427 of the actuator 421 is pressed to move the force transmitting end portion 426 to the unlocking position such that the second pin end 4222 of the locking pin 422 is disengaged from the annular groove 321 in the wheel axle 32, thereby permitting removal of the wheel axle 32 from the housing 41 to dismount the wheel unit 3 from the stroller frame 2. Preferably, the second pin end 4222 of the locking pin 422 is formed with an inclined guide face 428, and the outer axle surface of the wheel axle 32 has a cam surface 322 proximate to the annular groove 321. Accordingly, when the wheel axle 32 is extended into the axle receiving space 429 during mounting of the wheel unit 3 to the stroller frame 2, the cam surface 322 of the wheel axle 32 abuts against the inclined guide face 428 and drives the second pin end 4222 of the locking pin 422 to move away from the axis (A). Subsequently, when the annular groove 321 in the wheel axle 32 is registered with the second pin end 4222 of the locking pin 422, the elastic member 423 urges the actuator 421 to pivot so as to restore the force transmitting end portion 426 to the locking position, where the second pin end 4222 once again engages the annular groove 321 to prevent removal of the wheel axle 32 from the housing 41.

Aside from guiding and positioning the wheel axle 32 in the axle receiving space 429, the plug member 425 further has the function of arresting vibration of the wheel axle 32 when the wheel body 31 rotates, thereby enhancing stability during movement of the stroller. However, the plug member 425 is not necessarily a separate component in other embodiments of this invention. In practice, the housing 41 may be a solid structure formed with an axle receiving space 429 such that the wheel axle 32 is directly extended into the axle receiving space 429 and positioned by the locking pin 422 through the positioning hole 417 of the housing 41.

Figure 8:
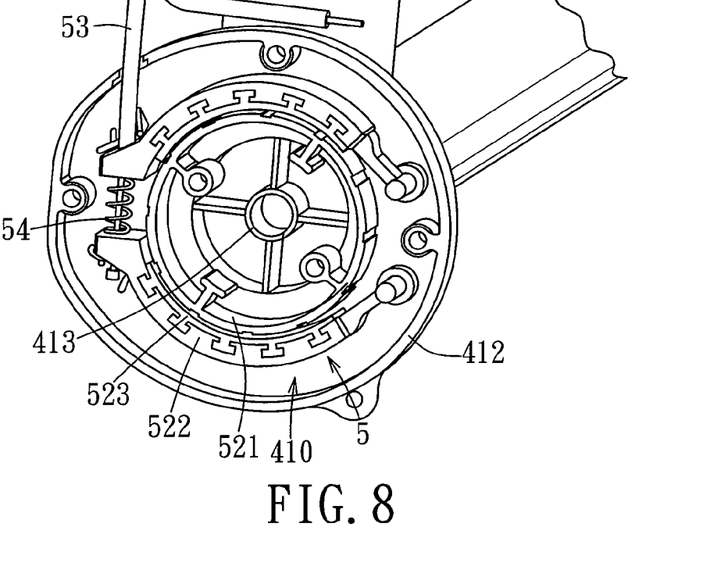
FIG. 8 is a fragmentary schematic side view to illustrate a hand brake of the first preferred embodiment.
Figure 9:
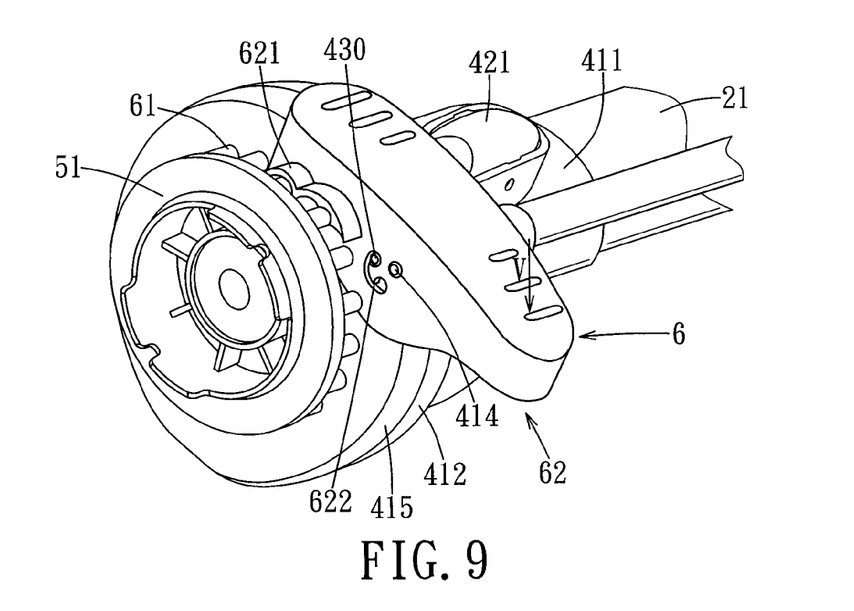
FIG. 9 is a fragmentary assembled perspective view to illustrate a braking state of a foot brake of the first preferred embodiment.

Referring to FIGS. 5, 8 and 9, the housing 41 has a central axle hole 413 formed through the brake installing portion 412 to permit extension of the wheel axle 32 into the housing 41. The hand brake 5 includes two drums 51 (only one is shown) each mounted to and co-rotatable with the wheel body 31 of the respective wheel unit 3, two drum braking mechanisms 52 (only one is shown) each mounted in the accommodating space 410 of the brake installing portion 412 of the respective housing 41 and operable to stop rotation of the respective drum 51, and two cords 53 each connected to the respective drum braking mechanism 52 for controlling braking operation of the respective drum braking mechanism 52. Each drum braking mechanism 52 includes a brake disc 521 connected to and co-rotatable with the respective drum 51, a pair of calipers 522 connected to the respective cord 53 and respectively disposed at opposite edge parts of the brake disc 521, and a pair of brake pads 523, each disposed between the brake disc 521 and a respective one of the calipers 522. The cords 53 are connected to a brake handle (not shown) of the stroller. By operating the brake handle, the calipers 522 can be driven through the respective cord 53 to urge the brake pads 523 tightly against the brake disc 521 and stop rotation of the respective drum 51, thereby braking the wheel unit 3. Each drum braking mechanism 52 further includes a brake spring 54 disposed between the calipers 522 for restoring the calipers 522 to a normal state, in which the brake pads 523 cease to contact the brake disc 521, when the brake handle is released.

Figure 10:
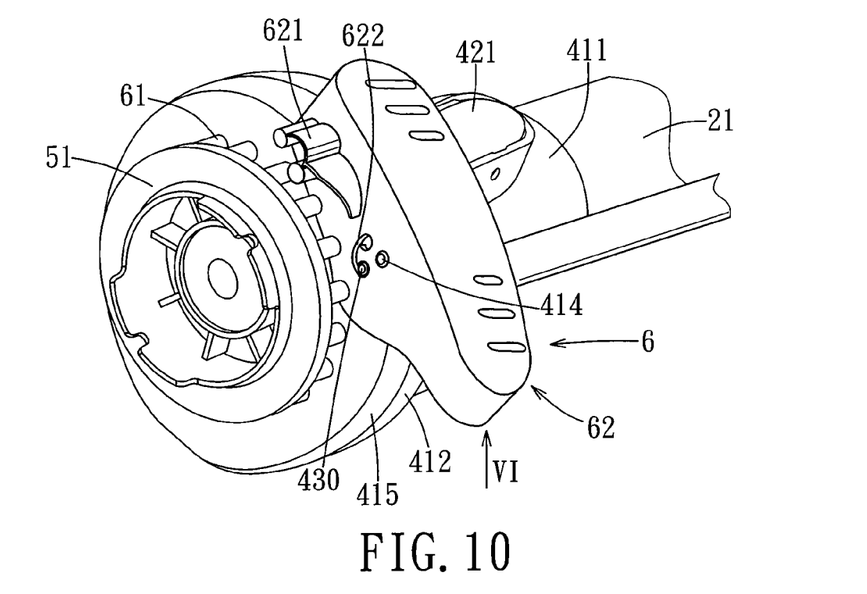
FIG. 10 is a view similar to FIG. 9, but illustrating a released state of the foot brake.

Referring to FIGS. 5, 9 and 10, the foot brake 6 includes two sets of angularly spaced apart brake teeth 61 (only one set is shown) each provided on the respective drum 51 and surrounding the axis (A), and two brake pedals 62 (only one is shown) each connected pivotally to the brake cover 415 and the brake installing portion 412 of the respective housing 41 via a corresponding rivet 414 and operable to selectively engage and disengage the respective set of brake teeth 61. Each brake pedal 62 includes a stop flange 621 to selectively engage and disengage the brake teeth 61, and is formed with an arcuate slot 622. The brake cover 415 of each housing 41 has a limiting pin 430 that extends into the arcuate slot 622 of the corresponding brake pedal 62 to limit range of pivoting movement of the brake pedal 62 relative to the housing 41. Accordingly, when the wheel unit 3 is braked by the foot brake 6, the stop flange 621 on the brake pedal 62 engages the brake teeth 61 on the adjacent drum 51, and the limiting pin 430 abuts against an upper slot end of the arcuate slot 622. At this time, when an operating end of the brake pedal 62 is pressed in a direction (V) as shown in FIG. 9, the brake pedal 62 pivots about the rivet 414, thereby disengaging the stop flange 621 from the brake teeth 61 on the adjacent drum 51 and enabling the limiting pin 430 to abut against a lower slot end of the arcuate slot 622. The wheel unit 3 is released from braking action of the foot brake 6 at this time. Thereafter, to brake the wheel unit 3, the operating end of the brake pedal 62 is moved in a direction (VI) as shown in FIG. 10 to pivot the brake pedal 62 about the rivet 414 so as to once again engage the stop flange 621 with the brake teeth 61.

FIGS. 11 to 14 illustrate the second preferred embodiment of this invention. Unlike the previous embodiment, the second preferred embodiment does not include a hand brake.

Figure 11:
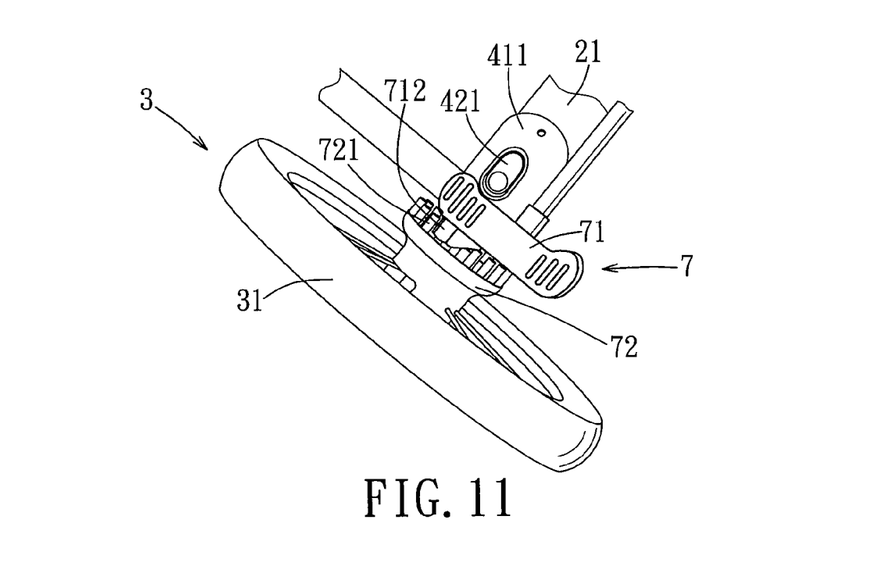
FIG. 11 is a fragmentary assembled perspective view of the second preferred embodiment of a removable wheel device according to the present invention.
Figure 12:
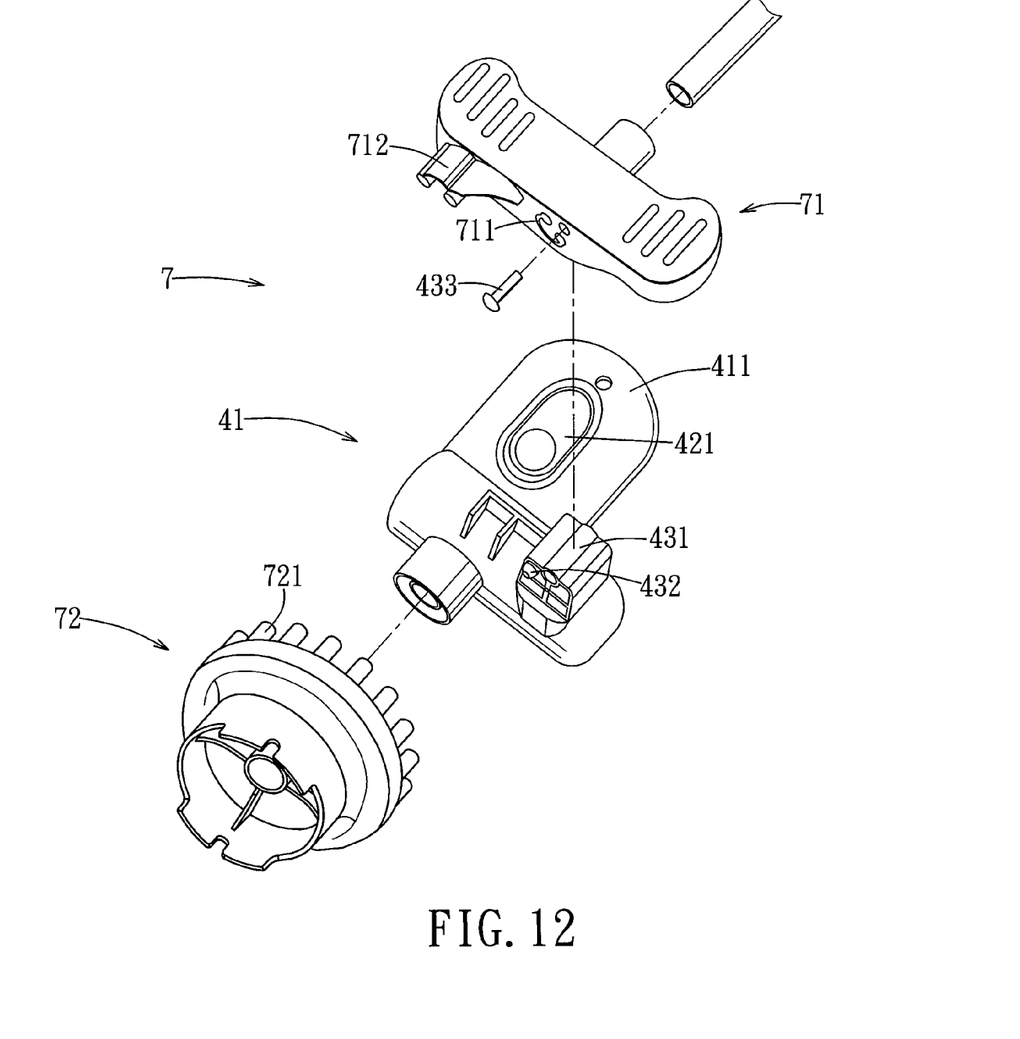
FIG. 12 is a fragmentary exploded perspective view to illustrate a foot brake of the second preferred embodiment.
Figure 13:
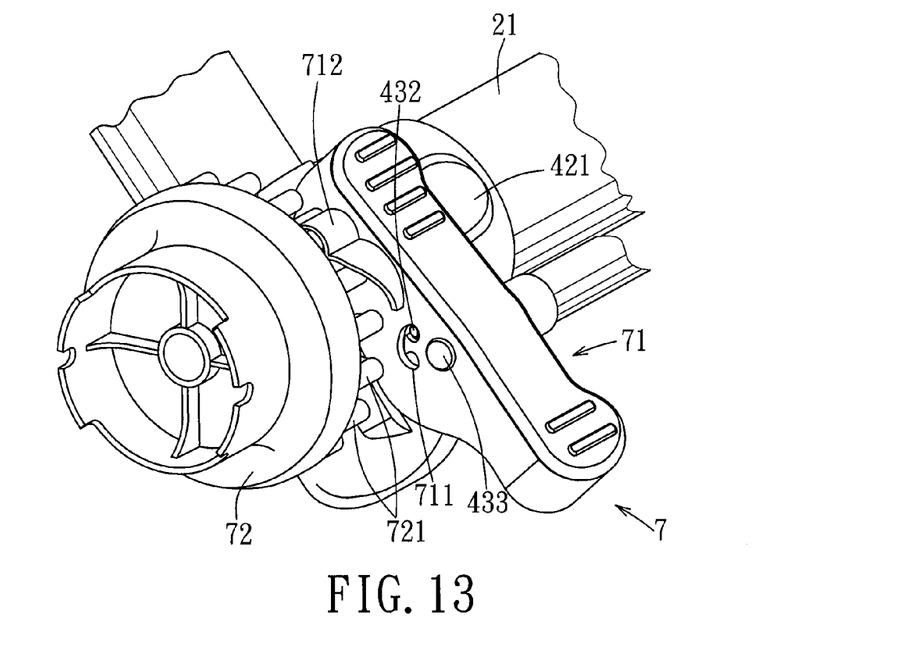
FIG. 13 is a fragmentary assembled perspective view to illustrate a braking state of the foot brake of the second preferred embodiment.
Figure 14:
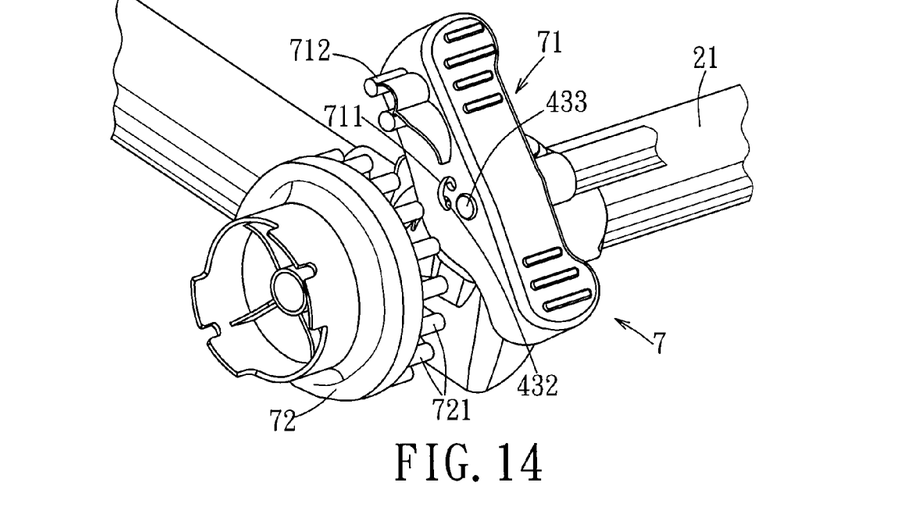
FIG. 14 is a view similar to FIG. 13, but illustrating a released state of the foot brake of the second preferred embodiment.

In this embodiment, the brake installing portion 431 projects from the frame mounting portion 411 of the housing 41, and has a limiting pin 432. The foot brake 7 in this embodiment operates in a manner similar to that of the foot brake 6 in the first preferred embodiment. The foot brake 7 includes a plurality of angularly spaced apart brake teeth 721 provided on a drum 72 and surrounding the axis (A) (see FIG. 5). The drum braking mechanism includes a brake pedal 71 connected pivotally to the brake installing portion 431 via a rivet 433 and operable to selectively engage and disengage the brake teeth 721. Like the previous embodiment, the brake pedal 71 includes a stop flange 712 to selectively engage and disengage the brake teeth 711, and is formed with an arcuate slot 711. The limiting pin 432 of the brake installing portion 431 extends into the arcuate slot 711 to limit range of pivoting movement of the brake pedal 71 relative to the housing 41.

It has thus been shown that the stroller of this invention includes the removable wheel devices 4 that can be easily mounted on and dismounted from the stroller frame 2. Moreover, the plug member 425 in the housing 41 not only provides positioning and guiding effects for the wheel axle 32, but also enhances stability during movement of the stroller. In addition, each of the removable wheel devices 4 is configured to work with a hand brake 5, a foot brake 6, or both.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. A stroller comprising:
   a stroller frame;
   a removable wheel device including
      a wheel unit including a wheel body and a wheel axle coupled to said wheel body, said wheel axle having an axis and an outer axle surface having an annular groove that surrounds said axis;

a housing having a frame mounting portion mounted on said stroller frame, said frame mounting portion having an outer surface with a ring-shaped barrier, the housing also having a brake installing portion connected to said frame mounting portion, said wheel axle removably extending into said housing, and a locking unit including an actuator disposed in said ring-shaped barrier of said frame mounting portion of the housing, said actuator having an operating end portion, a force transmitting end portion opposite to said operating end portion, and a pivot portion located between said operating end portion and said force transmitting end portion, the pivot portion being connected pivotally to said ring-shaped barrier of said frame mounting portion of said housing, an elastic member mounted between said operating end portion of said actuator and said housing, and a locking pin having a first pin end connected to said force transmitting end portion of said actuator and a second pin end opposite to said first pin end, said operating end portion of said actuator being depressible against restoring action of said elastic member to move said force transmitting end portion from a locking position, where said second pin end of said locking pin extends into said annular groove in said wheel axle to prevent removal of said wheel axle from said housing, to an unlocking position, where said second pin end of said locking pin is disengaged from said annular groove in said wheel axle to permit removal of said wheel axle from said housing; and a brake device including a drum mounted to and co-rotatable with said wheel body, and a drum braking mechanism mounted to said brake installing portion and operable to stop rotation of said drum.

2. The stroller as claimed in claim 1, wherein said locking unit further includes a plug member mounted in said housing, said plug member defining an axle receiving space to receive said wheel axle, and said plug member having a through hole disposed radially relative to said axis and in spatial communication with said axle receiving space, said locking pin extending through said through hole and into said axle receiving space to engage said annular groove of said wheel axle.

3. The stroller as claimed in claim 2, wherein said frame mounting portion of said housing includes a positioning hole registered with said through hole, said ring-shaped barrier surrounding said positioning hole and said retaining seat and said locking pin extending through said positioning hole, said frame mounting portion further having a retaining seat disposed at one side of said positioning hole for retaining said elastic member on said housing.

4. The stroller as claimed in claim 1, wherein said brake device is a hand brake that further includes a cord connected to said drum braking mechanism for controlling braking operation of said drum braking mechanism, said brake installing portion being disposed at one side of said frame mounting portion, said housing further including a brake cover for covering said brake installing portion, said brake cover and said brake installing portion cooperating to define an accommodating space to accommodate said drum braking mechanism.

5. The stroller as claimed in claim 4, wherein said drum braking mechanism includes:

a brake disc connected to and co-rotatable with said drum;

a pair of calipers connected to said cord; and a pair of brake pads, each disposed between said brake disc and a respective one of said calipers; said cord being operable to drive said calipers to urge said brake pads tightly against said brake disc to stop rotation of said drum.

6. The stroller as claimed in claim 4, further comprising a foot brake including a plurality of angularly spaced apart brake teeth that are provided on said drum and that surround said axis, and a brake pedal connected pivotally to said housing and operable to selectively engage and disengage said brake teeth.

7. The stroller as claimed in claim 6, wherein said brake pedal includes a stop flange operable to selectively engage and disengage said brake teeth.

8. The stroller as claimed in claim 6, wherein said brake pedal includes an arcuate slot, and said brake cover has a limiting pin that extends into said arcuate slot to limit range of pivoting movement of said brake pedal relative to said housing.

9. The stroller as claimed in claim 1, wherein said brake device is a foot brake that further includes a plurality of angularly spaced apart brake teeth, said brake teeth being provided on said drum and surrounding said axis, said brake installing portion projecting from said frame mounting portion, said drum braking mechanism including a brake pedal connected pivotally to said brake installing portion and operable to selectively engage and disengage said brake teeth.

10. The stroller as claimed in claim 9, wherein said brake pedal includes a stop flange to selectively engage and disengage said brake teeth.

11. The stroller as claimed in claim 9, wherein said brake pedal is formed with an arcuate slot, and said brake installing portion has a limiting pin that extends into said arcuate slot to limit range of pivoting movement of said brake pedal relative to said housing.

* * * * *